United States Patent [19]
Takada et al.

[11] Patent Number: 5,115,696
[45] Date of Patent: May 26, 1992

[54] HYDRAULIC PRESSURE CONTROL DEVICE WITH PARALLEL PRESSURE SUPPLY PASSAGES FOR CERTAIN ONE FRICTION ENGAGING MEANS

[75] Inventors: Mitsuru Takada; Makoto Funahashi, both of Toyota, Japan

[73] Assignee: Toyota Jidosha Kabushiki Kaisha, Toyota, Japan

[21] Appl. No.: 593,811

[22] Filed: Oct. 5, 1990

[30] Foreign Application Priority Data

Oct. 9, 1989 [JP] Japan ................. 1-263610

[51] Int. Cl.⁵ ............................. B60K 41/06
[52] U.S. Cl. .......................... 74/869; 74/867
[58] Field of Search ............ 74/868, 869, 867

[56] References Cited

U.S. PATENT DOCUMENTS

| | | | |
|---|---|---|---|
| 4,713,989 | 12/1987 | Hoyakawa et al. | 74/869 |
| 4,747,327 | 5/1988 | Itoh et al. | 74/868 |
| 4,982,624 | 1/1991 | Takeda et al. | 74/869 |
| 4,995,284 | 2/1991 | Takeda et al. | 74/869 X |
| 5,010,787 | 4/1991 | Takeda et al. | 74/867 |
| 5,012,700 | 5/1991 | Takeda et al. | 74/869 |

Primary Examiner—Leslie A. Braun
Assistant Examiner—Benjamin Levi
Attorney, Agent, or Firm—Oblon, Spivak, McClelland, Maier & Neustadt

[57] ABSTRACT

In a hydraulic pressure control device of an automatic transmission for a vehicle having a speed stage change-over gear mechanism and a plurality of hydraulically operated friction engaging means such as clutches and brakes to provide various speed stages, a certain one friction engaging means is adapted to be supplied with a hydraulic pressure both through a certain one port of a combination of a plurality of change-over valves and a passage system not passing through the certain one port when a certain speed stages is set up.

11 Claims, 6 Drawing Sheets

| RANGE | SPEED STAGE | | FIRST SOLENOID (400) | SECOND SOLENOID (410) | THIRD SOLENOID (420) | C1 (38) | C2 (40) | C3 (42) | C4 (44) | B1 (46) | B2 (48) | F1 (34) | F2 (36) | REMARKS |
|---|---|---|---|---|---|---|---|---|---|---|---|---|---|---|
| R | ALLOWED | | | | | | | O | | | O | | | |
|   | INHIBITED | | | | O | O | | | | | | | | ABOVE A PREDETERMINED SPEED |
| D | 1st | | O | | | O | | | | | | | O | |
|   | 2nd | | O | | O | O | | | O | | | O | O | |
|   | 3rd | | | | O | O | O | | O | | | | | |
|   | 4th | | | O | O | | O | | O | | | | | |
| S | 1st | | O | | O | O | | | | | | O | O | |
|   | 2nd | | O | O | O | O | O | | | | | O | O | |
|   | 3rd | | | O | O | O | | | O | | | O | O | |
|   | (3rd) | | | | | O | | | O | O | | O | O | WHEN SOLENOID VALVE FAILED |
| L | 1st | | O | | O | O | | | | O | | O | O | |
|   | 2nd | | O | O | | O | O | | | O | | O | O | |
|   | (2nd) | | | | O | O | O | | | O | | | O | WHEN SOLENOID VALVE FAILED |

HYDRAULIC PRESSURE CONTROL DEVICE WITH PARALLEL PRESSURE SUPPLY PASSAGES FOR CERTAIN ONE FRICTION ENGAGING MEANS

BACKGROUND OF THE INVENTION

1. Field of the Invention

The present invention relates to a hydraulic pressure control device of an automatic transmission for a vehicle such as an automobile, and more particularly, to an improvement with respect to a system for supplying and exhausting hydraulic pressure to and from friction engaging means such as clutches and brakes incorporated in the automatic transmission.

2. Description of the Prior Art

The automatic transmission for use in a vehicle such as an automobile has a speed stage change-over gear mechanism, and a plurality of hydraulically operated friction engaging means to change over a route of transmittance of torque in said speed stage change-over gear mechanism among various options so as selectively to set up each one of a plurality of speed stages. The hydraulic pressure control device of such an automatic transmission comprises a plurality of change-over valves adapted to operate in combination so as to change over supply and exhaust of hydraulic pressure to and from said plurality of friction engaging means according to selection among said speed stages to be set up. The supply and exhaust of the hydraulic pressure to and from some of said plurality of friction engaging means are directly controlled by a manual shift valve which changes over selection among shift ranges such as R, N, D, 2 and L, without passing through said plurality of change over valves. However, most and other friction engaging means are each finally connected to a certain exclusive port of a certain one of said plurality of change over valves so as to be supplied with or exhausted of hydraulic pressure through such each exclusive port according to selection among the speed stages to be set up.

In some of such friction engaging means it is desired that the speed of increasing the hydraulic pressure in the supply process thereof is different from the speed of decreasing the hydraulic pressure in the exhaust process thereof. In order to meet with such requirements it is known to incorporate a unidirectional flow resistance in a passage connecting such a friction engaging means with said certain port, or to incorporate a certain first flow resistance in a passage leading from said certain port and supplying the hydraulic pressure to said certain friction engaging means, while incorporating a second flow resistance different from said first flow resistance in a passage for draining said certain friction engaging means through said certain port.

A new type of automatic transmission proposed by Japanese Patent Application 62-195471 assigned to the same assignee as the present application has a plurality of clutches incorporated in parallel with one another in a power input portion thereof, wherein a first one of such clutches is engaged when the 1st, the 2nd and the 3rd speed stages are set up and is disengaged when the 4th speed stage is set up, while a second one of such clutches is engaged when the 3rd and the 4th speed stages are set up. In such an automatic transmission, when it is shifted down from the 4th speed stage to the 3rd or the 2nd speed stage, said first clutch which is disengaged in the 4th speed stage needs to be engaged.

In this automatic transmission, said first clutch need not be necessarily engaged in the 3rd speed stage because it is backed up by a one way clutch which is automatically engaged as the engine increases its rotational speed in the process of downshifting from the 4th speed stage to the 3rd speed stage. Therefore, in the downshifting from the 4th speed stage to the 3rd speed stage it is rather desirable that the engagement of said first clutch is delayed. However, when such an automatic transmission is shifted down from the 4th speed stage to the 2nd speed stage in which the engagement of said first clutch is essential, said first clutch needs to be engaged quickly. In other words, in said automatic transmission, when said first clutch is engaged in the downshifting from the 4th speed stage to the 3rd speed stage with a time lapse for the engine to increase the speed of rotation thereof, it is required that the hydraulic pressure is supplied thereto at a moderate speed so as to accomplish a shockless, smooth engagement thereof, whereas in the downshifting from the 4th speed stage to the 2nd speed stage it is required that a quick supply of hydraulic pressure to said first clutch is available. Therefore, it is required that a certain one friction engaging means can be supplied with the hydraulic pressure at two different speeds for the engagement thereof.

In order to meet with such requirements, in Japanese Patent Application 63-224328 assigned to the same assignee as the present application it has been proposed to incorporate a combination of a change-over valve and a throttling means in a passage connecting such a certain clutch finally with a certain port of a certain speed stage change-over valve, said change-over valve being combined with the throttle means and adapted to vary the flow resistance of the passage according to the change-over state thereof, so that, when said certain clutch is supplied with the hydraulic pressure in the downshifting from the 4th speed stage to the 3rd speed stage, the flow resistance of the passage is made to be relatively high, whereas, when said certain clutch is engaged for the automatic transmission being shifted down from the 4th speed stage to the 2nd speed stage, the flow resistance of the passage is made to be relatively low.

In the automatic transmission for vehicles the number of speed stages to be automatically set up is generally three or more, while the control of each friction engaging means therefor is basically alternative, i.e. engagement or disengagement, apart from the timing control in the process of engagement or disengagement thereof. Therefore, the hydraulic pressure control is an alternative control between supplying hydraulic pressure to a hydraulic pressure chamber of each friction engaging means and opening the hydraulic pressure chamber toward drain. The change-over valves generally employed in the hydraulic pressure control circuits in the automatic transmissions are spool valves which are of an alternatively controlling type to change over passages according to which of the two alternative shift positions a spool thereof is shifted to. Therefore, in the conventional hydraulic pressure control devices of the automatic transmissions two or more change-over valves are combined in a series connection so that selections among three or more speed stages are available based upon the principle of multiplication like $2 \times 2 = 4$ or $2 \times 2 \times 2 = 8$.

Thus, in the conventional art of combination of two or more change-over valves it is conceived that those change-over valves provide an integral "speed stage selection control box" which allows for selections among three or more speed stages, said box having a housing which defines a border thereof relative to the external means, said housing having a plurality of ports for hydraulic connections with respective friction engaging means, so that each such friction engaging means is supplied with hydraulic pressure or opened to drain through one of such ports exclusive thereto. Therefore, if any certain timing control is required in the supply and exhaust of hydraulic pressure with respect to a certain one of such friction engaging means, such a timing control is a control subsequent to the speed stage change-over control, i.e. a control to be done by a means other than said "speed stage selection control box", and accordingly, it has been considered that any means for such additional control may be incorporated in the passage connecting such a certain friction engaging means with such a certain port provided in said housing of said "speed stage selection control box" to be exclusive to said certain friction engaging means.

The improvement by the above-mentioned Japanese Patent Application 63-224328 is also based upon such a technical concept with respect to the hydraulic pressure control device for the automatic transmission.

SUMMARY OF THE INVENTION

It is the object of the present invention to be free from such a conventional basic technical concept in the hydraulic pressure control device for the automatic transmission, so that a hydraulic pressure required for each friction engaging means to set up certain speed stages may be optionally picked up from any portion of the hydraulic pressure control device without being limited to the exclusive port therefor provided in said "speed stage selection control box", and more to rationalize the hydraulic pressure control device.

According to the present invention, the above-mentioned object is accomplished by a hydraulic pressure control device of an automatic transmission for a vehicle, said transmission having a speed stage change-over gear mechanism, and a plurality of hydraulically operated friction engaging means to change over a route of transmittance of torque in said speed stage change-over gear mechanism among various options so as selectively to set up each one of a plurality of speed stages, comprising a plurality of change-over valves to change over supply and exhaust of hydraulic pressure to and from said plurality of friction engaging means according to selection among said speed stages to be set up, wherein a certain one of said friction engaging means is connected with a certain one port of a certain one of said plurality of change-over valves so as to be supplied with or exhausted of hydraulic pressure through said certain one port according to selection among said speed stages to be set up, said certain one friction engaging means being adapted to be supplied with hydraulic pressure also through a passage means not passing through said certain one port as well as through said certain one port when a certain one of said plurality of speed stages is set up.

By picking up a hydraulic pressure at any portion of the hydraulic pressure control device as proposed above if a hydraulic pressure of a certain desired performance is available therefrom, without being limited to the ports provided by the combination of a series of change-over valves, it is possible to obviate such a flow resistance change-over means as provided according to the conventional technical concept for variably controlling a passage in two different flow resistances.

In this connection, the art of selectively supplying a hydraulic pressure to a friction engaging means from other portions of the hydraulic pressure control device in addition to the supply of hydraulic pressure from an exclusive port in the combination of a series of change-over valves is already known in supplying the hydraulic pressure available at the 2 port or L port of a manual shift valve in the 2 range of L range to the friction engaging means without conducting it through any change-over valves. However, the hydraulic pressure available at the 2 port or L port of the manual shift valve is a hydraulic pressure selectively available according to the driver's manual operation of the manual shift valve and is not a hydraulic pressure selectively delivered by the automatic control operation of the hydraulic pressure control device. The hydraulic pressure supplied through a passage not passing through a certain final port of the hydraulic control circuit according to the present invention in addition to the passage leading from said certain final port is placed under the automatic speed stage change-over control by the automatic transmission.

Said passage means not passing through said certain one port may include a series connection of a first passage means conductive of a line pressure in said one speed stage and another certain first speed stage and a second passage means conductive of the line pressure in said one speed stage and another certain second speed stage excluding said certain first speed stage.

In this case, said one speed stage may be a 2nd speed stage, said certain first speed stage may be a 1st speed stage, and said certain second speed stage may be a 3rd or a 4th speed stage.

Further, in this case, said first passage means may be provided by a 2-3 shift valve adapted to be shifted between two alternative shifting states according to whether said 1st or said 2nd speed stage is set up or said 3rd or said 4th speed stage is set up.

Alternatively, in this case, said first passage means may be provided by a passage means the conductivity of the line pressure of which is controlled by a solenoid valve adapted to be shifted between two alternative shifting states according to whether said 1st or said 2nd speed stage is set up or said 3rd or said 4th speed stage is set up.

Further, said second passage means may be provided by a 1-2 shift valve adapted to be shifted between two alternative shifting states according to whether said 1st speed stage is set up or said 2nd, said 3rd or said 4th speed stage is set up.

In this case, said 2-3 shift valve may have a port which delivers the line pressure in said 1st and said 2nd speed stage and is closed in said 3rd and said 4th speed stage.

Alternatively, said one speed stage may be a 2nd speed stage, said certain first speed stage may be a 3rd or a 4th speed stage, and said certain second speed stage may be a 1st speed stage.

In this case, said first passage means may be provided by a series connection of a passage means the conductivity of the line pressure of which is controlled by a solenoid valve adapted to be shifted between two alternative shifting states according to whether said 1st or said 4th speed stage is set up or said 2nd or said 3rd speed stage is set up and a 1-2 shift valve adapted to be shifted between two alternative shifting states according to whether said 1st speed stage is set up or said 2nd, said 3rd or said 4th speed stage is set up.

In this case, said second passage means may be provided by a 2-3 shift valve adapted to be shifted between two alternative shifting states according to whether said 1st or said 2nd speed stage is set up or said 3rd or said 4th speed stage is set up.

BRIEF DESCRIPTION OF THE DRAWINGS

In the accompanying drawings.

DESCRIPTION OF THE PREFERRED EMBODIMENTS

In the following the present invention will be described in more detail with respect to some preferred embodiments thereof with reference to the accompanying drawings.

Figures 1, 2:
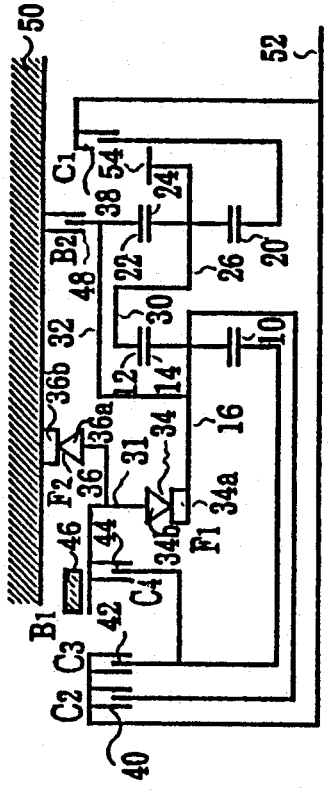
FIG. 1 is a schematic illustration of a planetary gear type speed stage change-over device of an automatic transmission for a vehicle to which the hydraulic control device according to the present invention is applied.
FIG. 2 is a chart showing combinations of energization of the solenoid valves and engagement of the clutches and brakes for setting up various speed stages.

FIG. 1 shows an example of a speed stage change-over gear mechanism in an automatic transmission for a vehicle to which the hydraulic pressure control device according to the present invention is applied. In this FIG., 10 designates a sun gear, 12 does a first ring gear coaxial with said first sun gear, 14 does a planetary pinion meshing with said first sun gear 10 and said first ring gear 12, and 16 does a first carrier rotatably supporting said first planetary pinion 14, these gear elements thus constructing in combination a first planetary gear mechanism. Similarly, 20 designates a second sun gear, 22 does a second ring gear coaxial with said second sun gear, 24 does a planetary pinion meshing with said second sun gear 20 and said second ring gear 22, and 26 does a second carrier rotatably supporting said second planetary pinion 24, these gear elements thus constructing a second planetary gear mechanism. The first ring gear 12 is connected with the second carrier 26 by a connecting member 30. The first carrier 16 is connected with the second ring gear 22 by a connecting member 32.

Between the combination of the first carrier 16 and the second ring gear 22 by the connecting member 32 and a housing 50 there is provided a series combination of a first one way clutch 34 and a second one way clutch 36, wherein the first one way clutch 34 is positioned on the side closer to the first carrier 16, while the second one way clutch 36 is positioned on the side closer to the housing 50. In more detail, the first one way clutch 34 is connected at an inner race 34a thereof with the first carrier 16 and at an outer race 34b thereof with an inner race 36a of the second one way clutch 36 via a connecting member 31, while an outer race 36b of the second one way clutch 36 is connected with the housing 50.

The second carrier 26 is connected with an output gear wheel 54 and constantly operates as an output member.

The first one way clutch 34 is engaged when the outer race 34b would run faster than the inner race 34a in engine driving and is disengaged in a relative rotary state opposite thereto. The rotary directions for engagement and disengagement between the inner race 36a and the outer race 36b of the second one way clutch 36 are the same as those of the first one way clutch 34.

A first clutch 38 is provided between the second sun gear 20 and an input shaft 52 for selectively connecting them with one another. A second clutch 40 is provided between the first carrier 16 and the input shaft 52 for selectively connecting them with one another. A third clutch 42 is provided between the first sun gear 10 and the input shaft 52 for selectively connecting them with one another. A fourth clutch 44 is provided between the first sun gear 10 and the connecting member 31 for selectively connecting them with one another.

A first brake 46 is provided between the connecting member 31 and the housing 50 for selectively fixing the connecting member 31 to the housing 50.

A second brake 48 is provided between the second ring gear 22 and the housing 50 for selectively fixing the second ring gear 22 to the housing 50.

The planetary gear type speed stage change-over device having the above-mentioned construction provides 1st speed stage, 2nd speed stage, 3rd speed stage (direct connection stage), 4th speed stage (overdrive stage), and reverse stage according to engagement and disengagement of the clutches and brakes as shown in Table 1 and FIG. 2, wherein a circle (○) indicates that the corresponding clutch, brake or one way clutch is engaged, and the circle in parentheses in Table 1 indicates that the corresponding brake is engaged to provide the availability of engine braking.

TABLE 1

|  | C1 38 | C2 40 | C3 42 | C4 44 | B1 46 | B2 48 | F1 34 | F2 36 |
|---|---|---|---|---|---|---|---|---|
| 1st speed stage | ○ |  |  |  |  | (○) | ○ | ○ |
| 2nd speed stage | ○ |  |  | ○ | (○) |  |  | ○ |
| 3rd speed stage | ○ | ○ |  | ○ |  |  | ○ |  |
| 4th speed stage |  | ○ |  | ○ | ○ |  |  |  |
| Reverse stage |  |  | ○ |  |  | ○ |  |  |

When the ratio of the number of gear teeth of the first sun gear 10 to that of the first ring gear 12 is $r_1$, and the ratio of the number of gear teeth of the second sun gear 20 to that of the second ring gear 22 is $r_2$, the gear ratios at the respective speed stages are as shown in Table 2.

TABLE 2

|  | Gear Ratio |
|---|---|
| 1st speed stage | $(1 + r_2)/r_2$ |
| 2nd speed stage | $(1 + r_2)/r_2 - 1/\{r_2(1 + r_1)\}$ |
| 3rd speed stage | 1 |
| 4th speed stage | $1/(1 + r_1)$ |
| Reverse stage | $-1/r_1$ |

The first clutch 38, the second clutch 40, the third clutch 42, the fourth clutch 44, the first brake 46 and the second brake 48 are all of a hydraulic operating type having hydraulic pressure chambers 38a, 40a, 42a, 44a, 46a and 48a, respectively, and are adapted to be engaged when a hydraulic pressure is supplied to the hydraulic pressure chambers and are disengaged when the hydraulic pressure has been exhausted from the hydraulic pressure chambers. The supply and the exhaust of the hydraulic pressure to and from those hydraulic pressure chambers are carried out by a hydraulic control device such as shown in FIG. 3.

Figure 3:
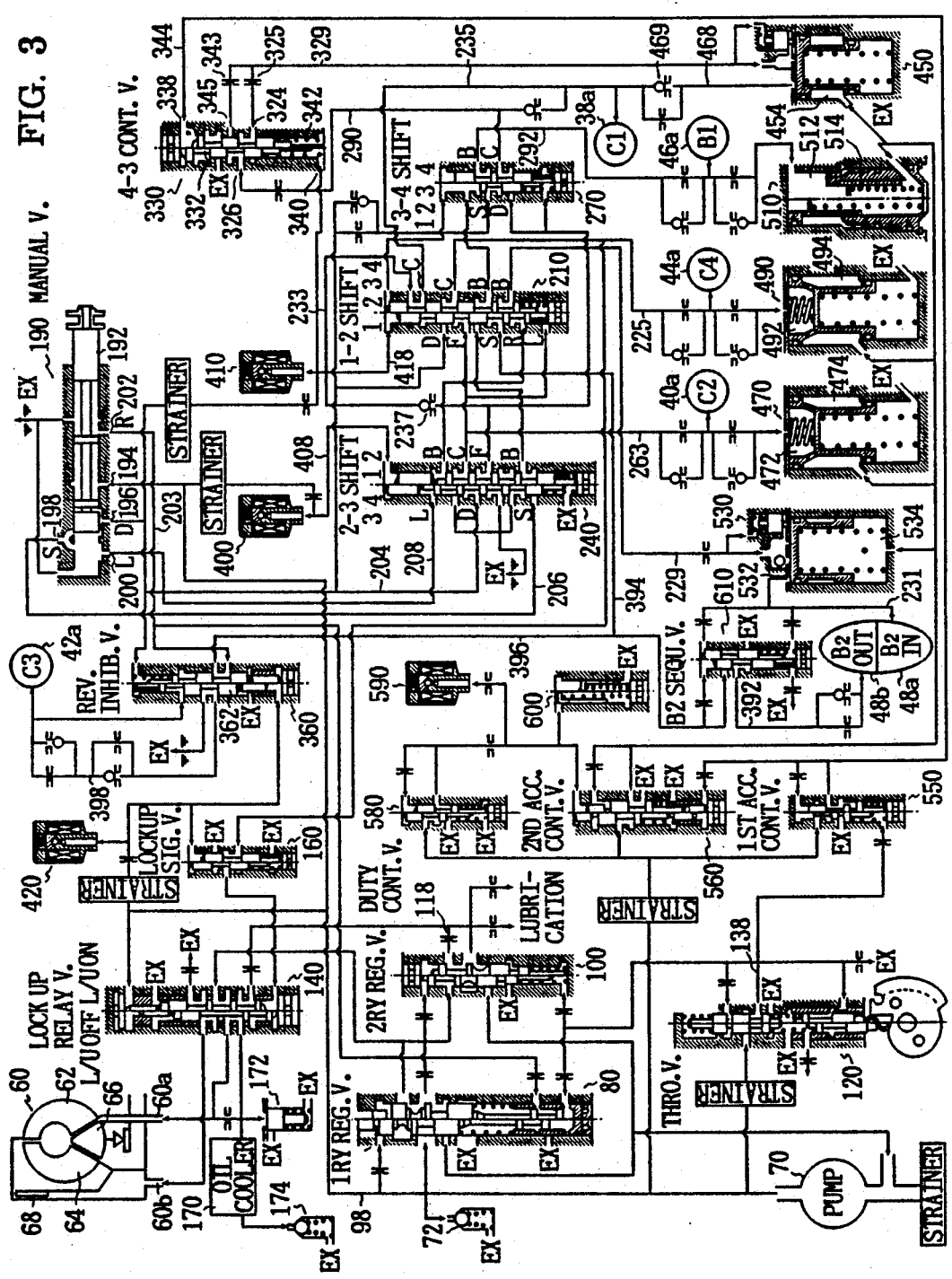
FIG. 3, shows a hydraulic control circuit in which the present invention may be incorporated.

The input shaft 52 of the above-mentioned planetary gear type speed change device is drivingly connected with a motor such as an internal combustion engine not shown in the figure by a fluid torque converter 60 such as shown in FIG. 3.

The fluid torque converter 60 is of a three elements two phases type comprising a pump impeller 62 drivingly connected with an output member of the motor, a turbine rotor 64 drivingly connected with the input shaft 52 of the planetary gear type speed change device, and a stator 66 rotatable only in one direction. The fluid torque converter 60 further comprises a lock-up clutch 68 which is engaged to directly connect the pump impeller 62 with the turbine rotor 64 when a hydraulic pressure is supplied to its port 60a and is disengaged when a hydraulic pressure is supplied to its port 60b. The supply of hydraulic pressure to the ports 60a and 60b is carried out by the hydraulic control device shown in FIG. 3.

The outline of the hydraulic control device for the automatic transmission for a vehicle will now be described with reference to FIGS. 3-4.

The hydraulic control device comprises a pump 70 which takes in a hydraulic fluid such as oil from a reservoir not shown in the figure and supplies the pressurized hydraulic fluid to a primary regulator valve 80 generally called a line pressure control valve and also to a throttle valve 120. The maximum value of the hydraulic pressure supplied by the pump 70 to the primary regulator valve 80 is restricted by a pressure relief valve 72.

The throttle valve 120 provides a hydraulic pressure which varies in accordance with the load on the engine and is generally called a throttle pressure in a passage 138.

The primary regulator valve 80 is supplied with the throttle pressure and a reverse boost pressure and provides the line pressure which generally increases in accordance with increase of the throttle opening in a passage 98 and a hydraulic pressure for a secondary regulator valve 100 generally called a converter pressure control valve.

The secondary regulator valve 100 is supplied with the throttle pressure and provides a converter pressure (lubricating oil pressure) in a passage 118. The line pressure in the passage 98 is supplied to a port 194 of a manual valve 190. The manual valve 190 has a spool 192 adapted to be operated by a hand of a driver and selectively provides the line pressure supplied to the port 194 at a D port 196 in the D range, at an S port 198 in the 2 range at an L port 200 in the L range, and at an R port 202 in the R range.

The line pressure supplied to the D port 196 is conducted through a passage 204 to a D port 214 of a 1-2 shift valve 210, a D port 246 of a 2-3 shift valve 240, and a D port 274 of a 3-4 shift valve 270. The line pressure supplied to the S port 198 is conducted through a passage 206 to an S port 248 of the 2-3 shift valve 240. The line pressure supplied to the L port 200 is conducted through a passage 208 to an L port 250 of the 2-3 shift valve 240. The line pressure supplied to the R port 202 is conducted through a passage 203 to a reverse inhibit valve 360.

Figure 4:
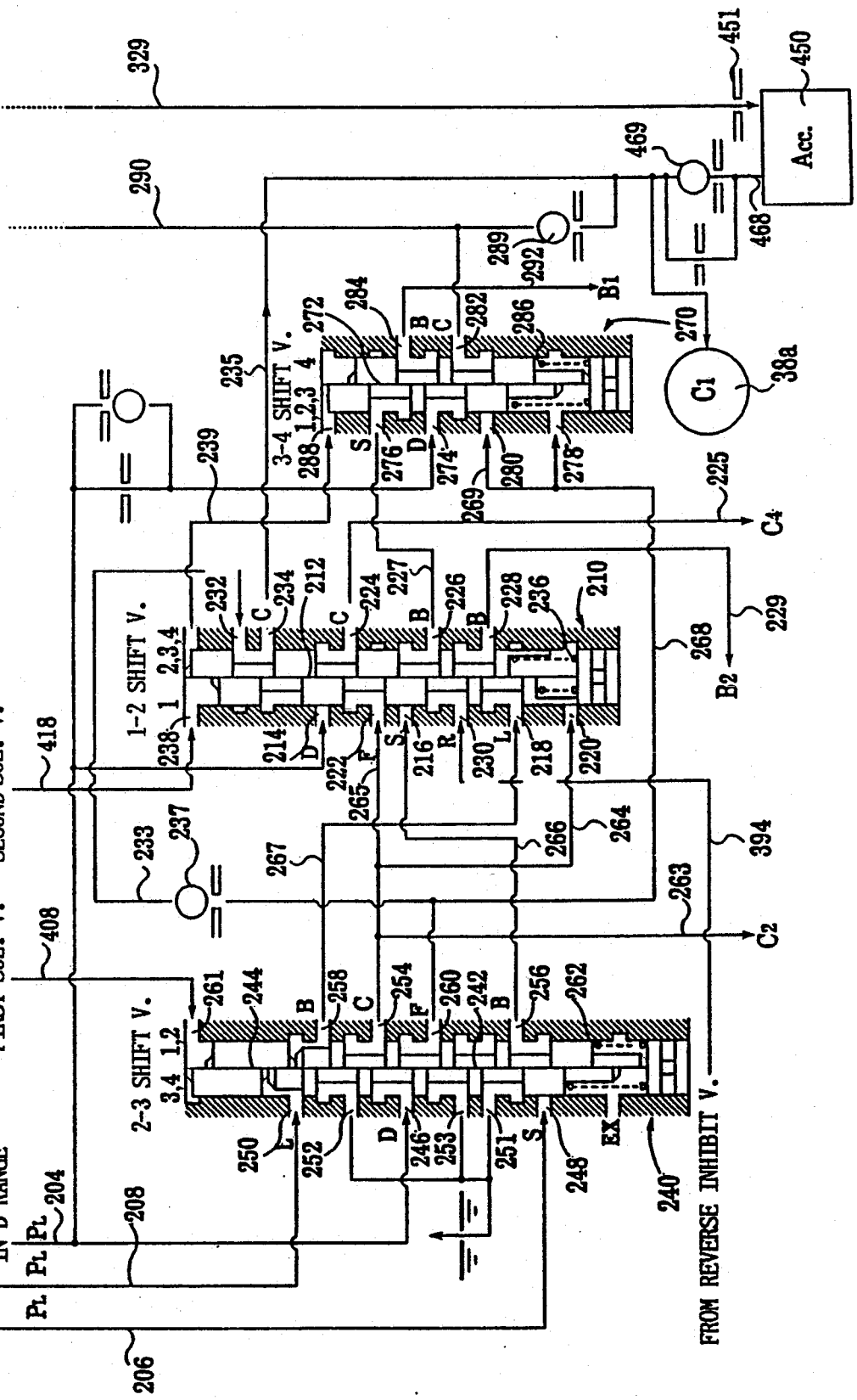
FIG. 4 is a diagram of a part of the hydraulic control circuit shown in FIG. 3, showing it in more detail with respect to portions thereof incorporating a first embodiment of the present invention.

As shown in FIG. 4 the 2-3 shift valve 240 comprises a spool element 242 and a plug element 244, and in addition to the above-mentioned ports further comprises drain ports 251, 252 and 253, a clutch port 254, brake ports 256 and 258 and a fail safe port 260. When a hydraulic pressure is supplied to a control port 261, the plug element 244 and the spool element 242 are shifted downward in the figure to a shift position as shown in the right half portion thereof by overcoming the spring force of a compression coil spring 262 so as to connect the clutch port 254 with the drain port 252, the brake port 256 with the S port 248, the brake port 258 with the L port 250, and the fail safe port 260 with the D port 246, respectively. In contrast, when no hydraulic pressure is supplied to the control port 261, the plug element 244 and the spool element 242 are shifted upward in the figure to a shift position as shown in the left half portion thereof by the spring force of the compressing coil spring 262 so as to connect the clutch port 254 with the D port 246, and the brake ports 256 and 258 and the fail safe port 260 with the drain ports 251, 252 and 252, respectively.

The supply of the hydraulic pressure to the control port 261 is controlled by a first solenoid valve 400.

The clutch port 254 is connected through a passage 263 with the hydraulic pressure chamber 40a of the second clutch 40 and an accumulator chamber 472 of an accumulator 470 for the clutch $C_2$. The clutch port 254 is also connected through a passage 264 with a hold port 220 of the 1-2 shift valve 210, and also through a passage 265 with a fail safe port 222 of the 1-2 shift valve 210. The brake port 256 is connected through a passage 266 with the S port 216 of the 1-2 shift valve 210. The brake port 258 is connected through a passage 267 with the L port 218 of the 1-2 shift valve 210. The fail safe port 260 is connected through a passage 268 with a hold port 278 of the 3-4 shift valve 270 and also connected through a passage 269 with a drain port 280 of the 3-4 shift valve 270.

As also shown in FIG. 4, the 1-2 shift valve 210 comprises a spool element 212, and in addition to the above-mentioned ports further comprises a clutch port 224, brake ports 226 and 228, an R port 230, a port 232 and a clutch port 234. When a hydraulic pressure is supplied to a control port 238 the spool element 212 is shifted downward in the figure as shown in the left half portion thereof to a shift position by overcoming the spring force of a compression coil spring 236 so as to connect the clutch port 224 with the fail safe port 222, the brake port 226 with the R port 230, and the brake port 228 with the L port 218, while isolating the port 232 from the clutch port 234. In contrast, when no hydraulic pressure is supplied to the control port 238, the spool element 212 is shifted upward as shown in the right half portion thereof to a shift position by the spring force of the compression coil spring 236 so as to connect the clutch port 224 with the D port 214, the brake port 226 with the S port 216, the brake port 228 with the R port 230, and the port 232 with the clutch port 234.

The supply of the hydraulic pressure to the control port 238 is controlled by a second solenoid valve 410. The control port 238 is connected through a passage 239 with the control port 288 of the 3-4 shift valve 270.

The clutch port 224 is connected through a passage 225 with the hydraulic pressure chamber 44a of the fourth clutch 44 and an accumulator chamber 492 of an accumulator 490 for the clutch C4. The brake port 226 is connected through a passage 227 with the S port 276 of the 3-4 shift valve 270. The brake port 228 is connected through a passage 229 with an accumulator chamber 532 of an accumulator 530 for the brake B2, and is further connected through a passage 231 with the inside hydraulic pressure chamber 48a of the second brake 48.

The port 232 is connected through a passage 233 with the fail safe port 260 of the 2-3 shift valve 240. In this passage 233 there is provided a one way valve 237 which allows the hydraulic fluid to flow only in a direction of flowing from the fail safe port 260 to the port 232. The clutch port 234 is connected through a passage 235 with the hydraulic pressure chamber 38a of the first clutch 38. The hydraulic passage system extending from the fail safe port 260 to the hydraulic pressure chamber 38a of the first clutch 38 through the ports 232 and 234 is the essential portion of the present invention. The operation of this hydraulic passage system will be described in detail later.

Also referring to FIG. 4, the 3-4 shift valve 270 comprises a spool element 272, and in addition to the above-mentioned ports further comprises a clutch port 282 and a brake port 284. When no hydraulic pressure is supplied to the hold port 278 while a hydraulic pressure is supplied to the control port 288, the spool element 272 is shifted downward thereof by overcoming the spring force of a compression coil spring 286 so as to connect the clutch port 282 with the drain port 280, and the brake port 284 with the D port 274. In contrast, when a hydraulic pressure is supplied to the hold port 278, or when no control pressure sis supplied to the control port 288, the spool element 272 is shifted upward in the figure to a shift position as shown in the left half portion thereof by the hydraulic pressure supplied to the port 278 and/or the spring force of the compression coil spring 286 so as to connect the clutch port 282 with the D port 274, and the brake port 284 with the S port 276.

The clutch port 282 is connected through a passage 290 with a port 326 of a 4-3 control valve 330, and the brake port 284 is connected through a passage 292 with a hydraulic pressure chamber 46a of the first brake 46 and an accumulator chamber 512 of a B1 accumulator 512.

The first solenoid valve 400 and the second solenoid valve 410 are normally open type valves which open their ports when not energized and close their ports when energized. The manner of energization of these solenoid valves is shown in FIG. 2 in relation with the speed stages to be set up. In FIG. 2 a circle (○) indicates energization of the corresponding solenoid valve.

The first solenoid valve 400 is connected through a passage 408 with the control port 261 of the 2-3 shift valve 240 and is adapted to supply a hydraulic pressure to the control port 261 when energized.

The second solenoid valve 410 is connected through a passage 418 with the control port 238 of the 1-2 shift valve 210, and is also connected through a passage 239 with the control port 288 of the 3-4 shift valve 270, and is further connected through a passage 416 with a hold port 340 of the 4-3 control valve 330, so that the hydraulic pressure is supplied to the control ports 238 and 288 and also to the hold port 340 when energized.

The 4-3 control valve 330 has a spool 332 which is shifted up as shown on the left half portion thereof in FIG. 3 by the spring action of a compression coil spring 342 when the control port 338 is supplied with no hydraulic pressure higher than a predetermined pressure level and by the hydraulic pressure when it is supplied to the hold port 340 so as to connect a port 326 with a port 345 while isolating the port 326 from a port 324, and is shifted down as shown on the right half portion therof against the spring force of the compression coil spring 342 when the hydraulic pressure supplied to the port 338 is higher than a predetermined pressure level while no hydraulic pressure is supplied to the hold port 340, so as to isolate the port 326 from the port 345, while connecting the port 326 with the port 324. The control port 338 is connected through a passage 344 with a first accumulator control valve 550 so as to be supplied with a first accumulator hydraulic pressure which changes according to the throttle opening.

The ports 345 and 324 are respectively connected with a passage 329 through passages including throttling means 325 and 343. The throttling means 350 is less throttled than the throttling means 325.

The hydraulic pressure chamber 38a of the first clutch 38 is directly connected with the clutch port 282 of the 3-4 shift valve 270 through a one way clutch 289 so as to be quickly exhausted of its hydraulic pressure therethrough.

The reverse inhibit valve 360 is supplied with the line pressure from the R port 202 of the manual valve 190 through the passage 203, and is switched over according to opening or closing of the third solenoid valve 420 so as to be at an inhibit position where a spool 362 is shifted up as shown in a left half portion thereof when the vehicle is running forward at a speed greater than a predetermined value and to be in a non inhibit position where the spool element 362 is shifted down as shown in the right half portion thereof during other operating conditions while allowing the line pressure from the passage 203 to flow to the passage 398 toward the hydraulic pressure chamber 42a of the third clutch 42, to the passages 396 and 394 toward the R port 230 of the 1-2 shift valve 210, and also to the passage 396, a B2 sequence valve 610 and the passage 392 toward the outside hydraulic pressure chamber 48b of the second brake 48.

The B2 sequence valve 610 operates in response to the hydraulic pressure in the inside hydraulic pressure chamber 48a of the second brake 48 so as to connect the passage 396 with the passage 392 so that the outside hydraulic pressure chamber 48b is supplied with the hydraulic pressure when the hydraulic pressure in the inside hydraulic pressure chamber 48a is greater than a predetermined value.

Accumulators 450, 4708 490, 510 and 530 are back pressure control type accumulators having back pressure chambers 454, 474, 494, 514 and 534, respectively. The hydraulic pressure supplied to these back pressure chambers is controlled by a second accumulator control valve 560. The inlet of the accumulator chamber 452 of the C1 accumulator 450 is formed by a throttle opening.

The second accumulator control valve 560 is supplied with a duty hydraulic pressure controlled by a duty solenoid valve 590 and the first accumulator hydraulic pressure from the first accumulator control valve 550 to change its output control pressure.

The duty solenoid valve 590 is supplied with a pulse signal having a determinate duty ratio and cyclically opens and closes according to the duty ratio so as to control a modulate hydraulic pressure from a duty control valve 580 according to the duty ratio. The duty hydraulic pressure controlled by the duty solenoid valve 590 for the second accumulator control valve 560 is rectified of its pulses by a duty pressure accumulator 600.

The first accumulator control valve 550 is supplied with the throttle pressure from the throttle valve 138 so as to generate the first accumulator hydraulic pressure which increases according to increase of the throttle opening, and supplies the first accumulator hydraulic pressure to the second accumulator control valve 560 and the 4-3 control valve 330.

The supply of the converter pressure to the ports 60a and 60b of the fluid torque converter 60 is controlled by a lock up relay valve 140.

The lock up relay valve 140 is switched over according to a selective supply of a hydraulic pressure from a lock up signal valve 160. The lock up relay valve 140 supplies oil toward an oil cooler 170. The hydraulic pressure in the passage including the oil cooler 170 is limited by a cooler by-pass valve 172 and a relief valve 174.

The lock up signal valve 160 is supplied with a hydraulic pressure from the clutch port 224 of the 1-2 shift valve 210 and is switched over in accordance with on and off of the third solenoid valve 420 so as to supply the hydraulic pressure supplied from the clutch port 224 to the lock up relay valve 140 and to engage the lock up clutch 68 when the third solenoid valve 420 is energized.

The third solenoid valve 420 is selectively energized as shown in FIG. 2 for inhibiting engagement of the lock up clutch 68 in the reverse stage when the manual shift valve is shifted to the R range and when the manual shift valve is sifted to the D range.

The operation of the hydraulic pressure control device described above in which the first embodiment of the present invention is incorporated will be described with respect to the operation under the D range.

First, the operation for the 1st speed stage will be described. In the 1st speed stage the first solenoid valve 400 and the second solenoid valve 410 are both energized, and therefore the control port 261 of the 2-3 shift valve 240, the control port 238 of the 1-2 shift valve 210 and the control port 288 of the 3-4 shift valve 270 are supplied with the hydraulic pressure. Therefore, the plug element 244 and the spool element 242 of the 2-3 shift valve 240 are shifted to the shift position shown in the right half portion thereof, and the spool element 212 of the 1-2 shift valve 210 is shifted to the shift position shown in the left half portion thereof. Therefore, the line pressure from the D port 196 of the manual shift valve 190 is supplied through the passage 204, the D port 246 of the 2-3 shift valve 240, the fail safe port 260, and the passage 268 to the hold port 278 of the 3-4 shift valve 270. The 3-4 shift valve 270 is supplied with hydraulic pressure at the control port 288. However, since the hold port 278 is also supplied with the hydraulic pressure, the spool element 272 is shifted to the shift position shown in the left half portion thereof by the spring force of the compression coil spring 286. Therefore, the D port 274 is connected with the clutch port 282, and the line pressure from the D port 196 of the manual shift valve 190 is supplied through the passage 290 to the port 326 of the 4-3 control valve 330. Since at this time the hold port 340 of the 4-3 control valve 330 is also supplied with the hydraulic pressure, the spool 332 of the 4-3 control valve 330 is shifted up as shown on the left half portion thereof in the figure so as to connect the port 326 with the port 356, whereby the hydraulic pressure is transmitted through the relatively moderate throttling means 354 to the passage 329, and then further through the throttling means 451, the accumulator chamber 452 of the $C_1$ accumulator 450, the passage 468, and the one way valve 469 to the hydraulic pressure chamber 38a of the first clutch 38 which is then engaged. Since the throttling means 354 has a relatively moderate throttling ratio, the supply of the hydraulic pressure to the hydraulic pressure chamber 38a is done at a relatively high speed, so that the engagement of the first clutch $C_1$, i.e. the setting up of the 1st speed stage, is done at high responsiveness.

Next, the 2nd speed stage will be described. In the 2nd speed stage the first solenoid valve 400 is only energized, so that the control port 261 of the 2-3 shift valve 240 only is still supplied with the hydraulic pressure. Therefore, the plug element 244 and the spool element 242 of the 2-3 shift valve 240 remains in the lower shift position, whereas the spool element 212 of the 1-2 shift valve 210 is shifted to the upper shift position shown in the right half portion thereof by the spring force of the compression coil spring 236. In the 3-4 shift valve 270 the hydraulic pressure in the control port 288 disappears and the spool element 272 still remains at the upper shift portion shown in the left half portion thereof by the hydraulic pressure supplied to the hold port 278 and the spring force of the compression coil spring 286. By the shifting over of the 1-2 shift valve 210 the D port 214 is now connected with the clutch port 224 so that the line pressure from the D port 196 of the manual shift valve 190 is supplied to the passage 225 to the hydraulic pressure chamber 44a of the fourth clutch 44 which is then engaged. Thus the first clutch 38 and the fourth clutch 44 are engaged, thereby setting up the second speed stage of the D range.

In this connection, as a result of upward shifting of the spool 212 of the 1-2 shift valve 210, the port 232 is connected with the clutch port 234, and therefore the hydraulic pressure is transmitted to the hydraulic pressure chamber 38a of the first clutch 38 through the passage 235 while bypassing the throttling means 354 and 325 and the $C_1$ accumulator 450. However, since the hydraulic pressure chamber 38a has already been supplied with the same level of pressure as described above, the state of engagement of the first clutch is not affected.

Next, the 3rd speed stage will be described. In the 3rd speed stage the first solenoid valve 400 and the second solenoid valve 410 are both not energized, so that the control port 238 of the 1-2 shift valve 210 and the control port 261 of the 2-3 shift valve 240 are both not supplied with hydraulic pressure. Therefore, the plug element 244 and the spool element 242 of the 2-3 shift valve 240 are lifted to the upper shift position as shown in the left half portion in the figure by the spring force of the compression coil spring 262, whereby the D port 246 of the 2-3 shift valve 240 is isolated from the fail safe port 260 thereof and is connected with the clutch port 254. Thus the line pressure from the D port 196 of the manual shift valve 190 is conducted through the passage 263 to the hydraulic pressure chamber 40a of the second clutch 40 which is then engaged. Since at this time the fail safe port 260 of the 2-3 shift valve 240 is drained through the drain port 253, the hold port 278 in the 3-4 shift valve 270 is drained of the hydraulic pressure which has ever been suppled. However, the spool element 272 still remains in the lifted shift position by the spring force of the compression coil spring 286. In the 1-2 shift valve 210, the spool element 212 remains in the lifted shift position as in the second speed stage. Therefore, in addition to the first clutch 38 and the fourth clutch 44 the second clutch 40 is now engaged, thereby setting up the third speed stage of the D range.

In the 3rd speed stage, the fail safe port 260 of the 2-3 shift valve 240 is connected to drain. However, since the one way valve 237 is provided in the passage 233, the hydraulic pressure chamber 38a of the first clutch 38 is not drained through this passage, ensuring the engagement of the first clutch 38.

Next, the 4th speed stage will be described. In the 4th speed stage the second solenoid valve 410 only is energized. Therefore, the control port 238 of the 1-2 shift valve 210 and the control port 288 of the 3-4 shift valve 270 are supplied with the hydraulic pressure. In the 1-2 shift valve 210 the hold port 220 is supplied with the hydraulic pressure from the clutch port 254 of the 2-3 shift valve 240 through the passage 264. Therefore, in spite of the supply of the hydraulic pressure to the control port 238 the spool element 212 remains in the lifted shift position shown in the right half portion thereof by the spring force of the compression coil spring 236. However, in the 3-4 shift valve 270, since the hold port 278 is connected through the passage 268 and the fail saft port 260 of the 2-3 shift valve 240 to the drain port 253, the spool element 272 is shifted downward in the lower shift position shown in the right half portion thereof by the hydraulic pressure supplied to the control port 288 by overcoming the spring force of the compression coil spring 286. Therefore, the D port 274 is connected with the brake port 284 instead of the clutch port 282 which is now connected to the drain port through the port 280, so as to be opened to drain with the hold port 278. Thus the hydraulic pressure chamber 38a of the first clutch 38 is now quickly exhausted of the hydraulic pressure through the one way valve 289, and therefore the first clutch 38 is disengaged. Instead, the line pressure is supplied to the hydraulic pressure chamber 46a of the first brake 46 which is now engaged. Therefore, the second clutch 40, the fourth clutch 44 and the first brake 46 are engaged, thereby setting up the overdrive 4th speed stage of the D range.

Next, the downshifting from the 4th speed stage to the 3rd speed stage with power on, that is a kickdown from the 4th speed stage to the 3rd speed stage, will be described. In this downshifting the first clutch 38 which has been disengaged in the 4th speed stage is again engaged to set up the 3rd speed stage. After the completion of the downshifting the states of engagement and disengagement of the clutches and brakes are exactly the same as those described above with respect to the 3rd speed stage. However, the transitional state is different. In the downshifting with power on, the throttle opening is relatively large, and therefore, the first accumulator hydraulic pressure generated by the first accumulator control valve 550 is relatively high. Therefore, in the 4-3 control valve 330, in which the control port 338 is supplied with the first accumulator hydraulic pressure, the spool 332 is shifted down to the lower position shown in the right half portion thereof in the figure against the spring force of the compression coil spring 342, so that the port 326 is isolated from the port 345 and is connected with the port 324. Therefore, the hydraulic pressure which is again delivered to the port 282 of the 3-4 shift valve 270 as a result of the spool 272 being shifted up to the upper shift position is transmitted through the passage 290 to the port 326 of the 4-3 control valve 330, and then the hydraulic pressure is transmitted through the port 324 and the throttling means 325 of a relatively high throttling ratio to the passage 329, and further the hydraulic pressure is transmitted through the accumulator chamber 452 of the $C_1$ accumulator 450, the passage 468, and the one way clutch 469 to the hydraulic pressure chamber 38a of the first clutch 38. Therefore, in this downshifting the first clutch 38 is relatively gradually engaged as compared with its engagement in setting up the 1st speed stage in the start of forward driving. Therefore, it is avoided that the first clutch 38 is substantially engaged before the one way clutch 34 is engaged in the downshifting from the 4th speed stage to the 3rd speed stage, so that the downshifting is completed with no substantial shock being caused in the downshifting. Herein it is to be noted that the engagement of the first clutch 38 is not essential to set up the direct connection state of the speed stage change-over gear mechanism for the 3rd speed stage under engine driving.

When the transmission is shifted down from the 4th speed stage to the 3rd speed stage by the prohibition of the overdrive stage by the overdrive prohibition means which is not shown in the drawing but well known in the art, the downshifting is a power off downshifting. Since the throttle opening in such power off downshifting is relatively small, the first accumulator hydraulic pressure supplied to the control port 338 of the 4-3 control valve is relatively low, so that the spool 332 of the 4-3 control valve 330 is held at the upper shift position shown in the left half portion thereof in the figure by the spring force of the compression coil spring 342, thereby connecting the port 326 with the port 345. In this state, the hydraulic pressure transmitted through the 4-3 control valve 330 is conducted through the throttling means 343 of a relatively moderate throttling ratio, so that the hydraulic pressure chamber 38a of the first clutch 38 is supplied with the hydraulic pressure at a higher speed than in the 4-3 kickdown so as to be more quickly put into a substantial engagement. Since no engine speed increase occurs in the power off downshifting under a small throttle opening, the onw way clutch 34 is not put into engagement. Therefore, if the engagement of the first clutch were delayed, there would occur a coasting under a neutral state. However, since the first clutch 38 is quickly engaged as described above, such a neutral coasting is avoided and the engine brake is quickly available.

When the accelerator pedal is deeply depressed in the 4th speed stage running of the vehicle, the automatic transmission is controlled to be immediately shifted down to the 2nd speed stage, providing the 4-2 kickdown. The state of the 2nd speed stage after the completion of the 4-2 kickdown is of course exactly the same as that attained by upshifting from the 1st speed stage. However, the transitional state is different. In the 2nd speed stage, the engagement of the first clutch 38 is essential to transmit the engine drive torque, and therefore, if the engagement of the first clutch is delayed, the engine will rev up under the deep depression of the accelerator pedal. Therefore, the first clutch 38 must be quickly engaged. When the first solenoid valve 400 is energized for setting up the 2nd speed stage, the spool 242 of the 2-3 shift valve 240 is shifted to the lower shift position as shown in the right half portion of thereof in the figure, whereby the fail safe port 260 is connected with the D port 246 so as to be supplied with the line pressure, which is transmitted through the passage 233 including the one way valve 237, the ports 232 and 234 of the 1-2 shift valve 210, and the passage 235 so as to be immediately supplied to the hydraulic pressure chamber 38a of the clutch 38. Thus, it is ensured that the first clutch 38 is engaged so far as to have a certain required torque transmitting function before the second clutch 40 is substantially disengaged, whereby any abnormal increase of engine rotational speed is avoided and a shockless speed stage shifting is accomplished.

Figure 5:
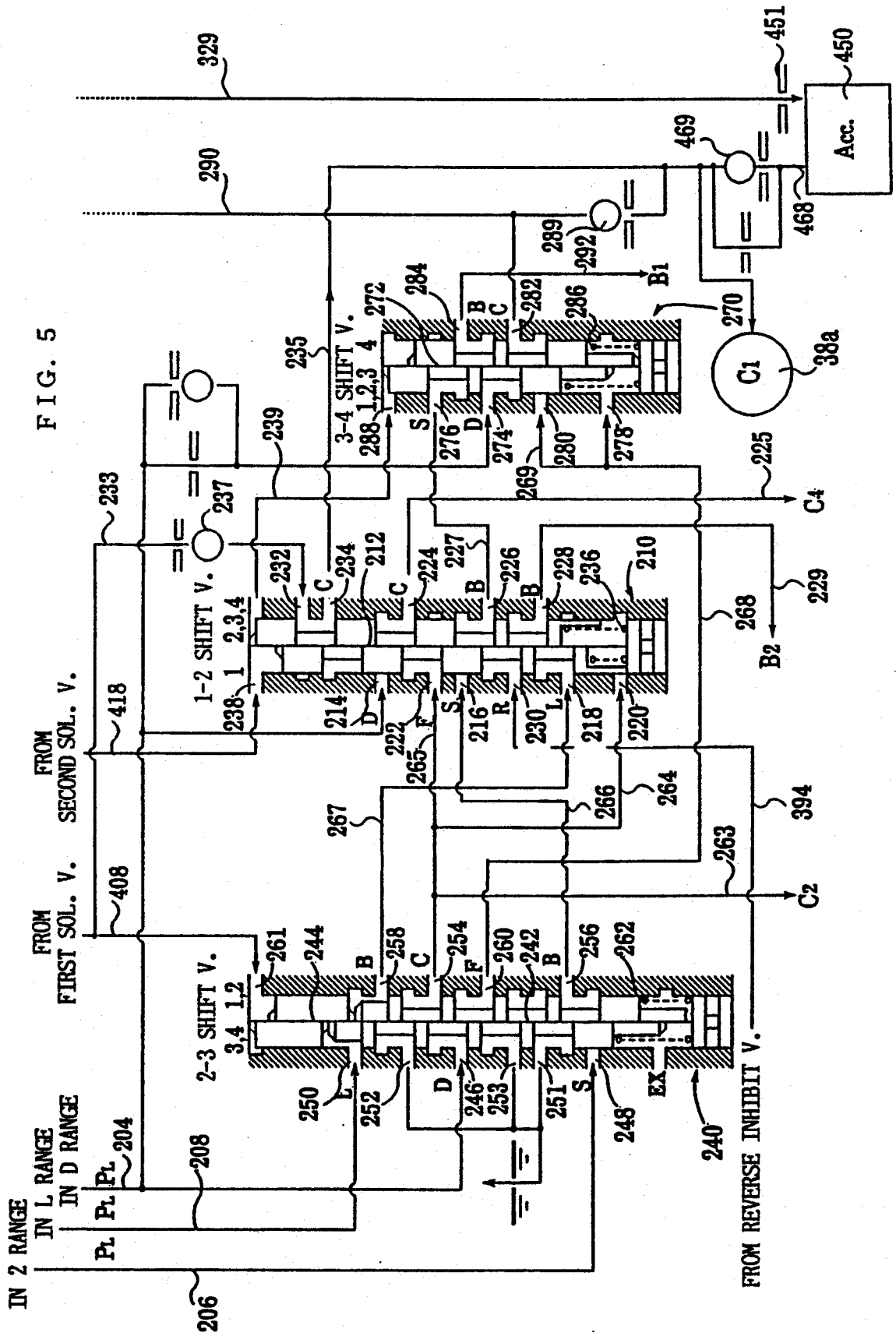
FIG. 5 is a view similar to FIG. 4, showing a second embodiment of the present invention.

FIG. 5 is a view similar to FIG. 4, showing a second embodiment of the present invention. In this second embodiment, instead of the construction in the first embodiment shown in FIG. 4 that the port 232 of the 1-2 shift valve 210 is connected through the passage 233 with the fail safe port 260 of the 2-3 shift valve so that it is supplied with the line pressure when the 2-3 shift valve 240 is in the lower shift position as shown in the right half portion thereof in the figure in the 1st and 2nd speed stages, the port 232 of the 1-2 shift valve 210 is connected through the passage 233 with the first solenoid valve 400 so as to be supplied with the line pressure when the first solenoid valve 400 is energized, i.e. when the 1st or the 2nd speed stage is set up. The leading of the passage 233 from the first solenoid valve 400 in FIG. 5 means, when it is viewed in FIG. 3, that the passage 233 is branched from the passage 408. The passage 233 incorporates therein a one way valve 237 adapted to allow the hydraulic fluid to flow only in a direction of flowing from the solenoid valve 400 to the port 232.

By this arrangement, also in the second embodiment, the port 234 of the 1-2 shift valve 210 is supplied with the line pressure only when the 2nd speed stage is set up, so as to let the first clutch 38 be quickly engaged in the 4-2 kickdown, as in the first embodiment shown in FIG. 4. Since the first solenoid valve 400 is deenergized to open its drain port in the 3rd speed stage, the one way valve 237 is required so as not to allow the hydraulic pressure to escape from the first clutch 38 through the passage 235, the ports 234 and 232 of the 1-2 shift valve 210 and the first solenoid valve 400.

Figure 6:
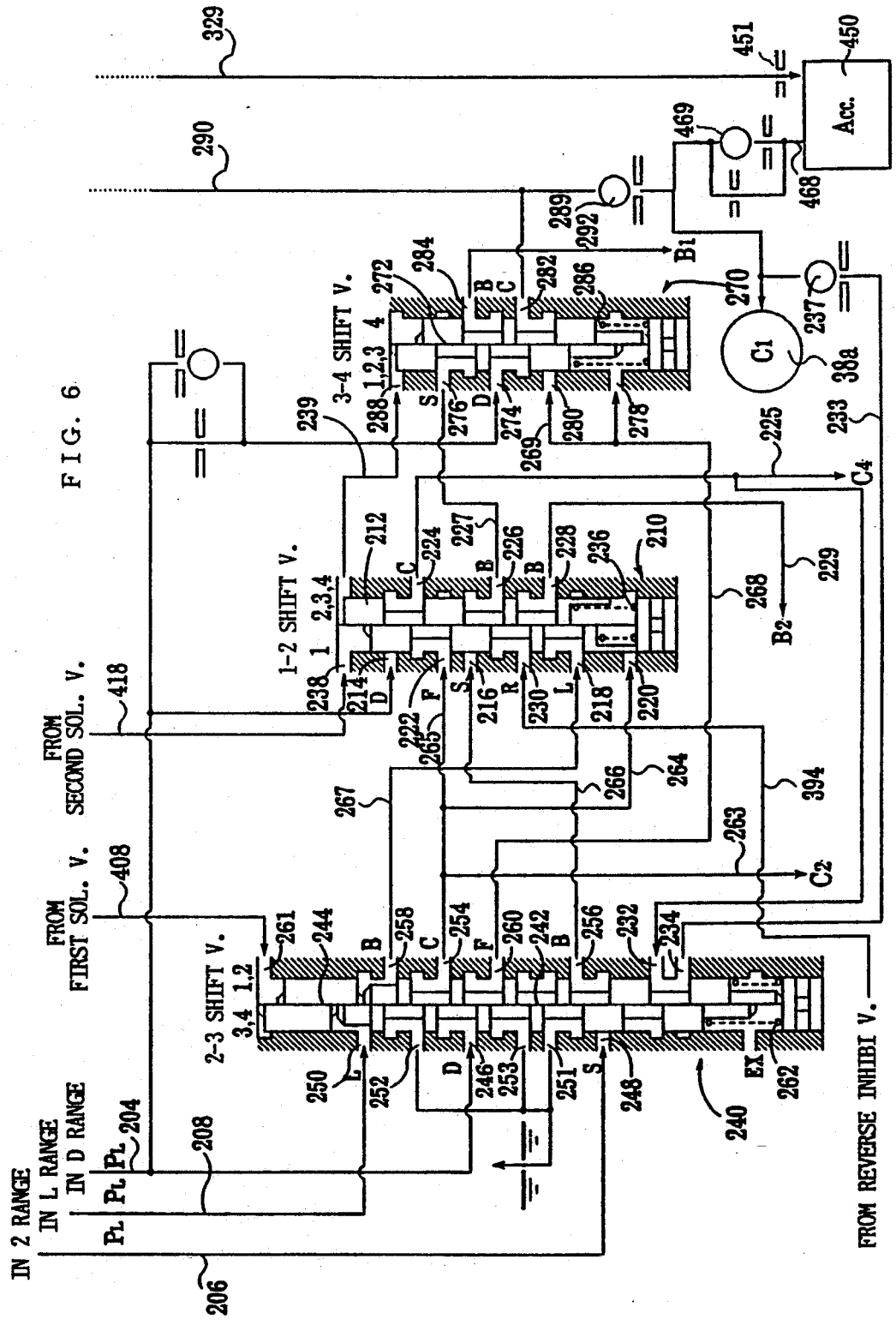
FIG. 6 is a view similar to FIGS. 4 and 6, showing a third embodiment of the present invention.

FIG. 6 is a view similar to FIGS. 4 and 5, showing a part of the hydraulic control circuit in which a third embodiment of the present invention is incorporated. In this embodiment, the hydraulic pressure chamber 38a of the first clutch 38 is adapted to be supplied with the line pressure delivered at the port 224 of the 1-2 shift valve 210 for the fourth clutch 44 in the 2nd, 3rd and 4th speed stages through ports 232 and 234 provided in the 2-3 shift valve 240. The ports 232 and 234 are connected with one another when the spool 242 of the 2-3 shift valve 240 is in the lower shift position to set up the 1st or the 2nd speed stage, and are isolated from one another when the spool 242 is in the upper shift position to set up the 3rd or the 4th speed stage. By this arrangement, the first clutch 38 is quickly supplied with the line pressure only when the 2nd speed stage is set up through the passage system different from the conventional passage system for the supply of the line pressure thereto including the accumulator 450. Also in this embodiment a one way valve 237 is required in the passage 233 so as to allow the hydraulic fluid to flow only in a direction of flowing from the ports 232 and 234 to the hydraulic pressure chamber 38a of the first clutch 38, because, when the spool 212 of the 1-2 shift valve is shifted to the lower shift position in the 1st speed stage, the port 224 is connected with the port 222, whereby the hydraulic pressure chamber 38a of the clutch 38 would otherwise be drained through these ports, the passage 265, and the ports 254 and 252 of the 2-3 shift valve 240.

Further, in this third embodiment, the 2-3 shift valve 240 will have to be made somewhat longer for the incorporation of the ports 232 and 234, as compared with the 2-3 shift valve 240 in the first or the sending embodiment shown in FIGS. 4 or 5, respectively. However, since in this third embodiment the 1-2 shift valve 21 has no such ports 232 and 234, it can be made somewhat shorter.

The first, second and third embodiments described above are so constructed as to obtain a certain line pressure to be delivered only in the second speed stage by conducting the line pressure delivered at the fail safe port 260 of the 2-3 shift valve 240 or available from the first solenoid valve 400 only in the 1st and 2nd speed stages through the ports 232 and 234 of the 1-2 shift valve 210 adapted to communicate with one another only in the 2nd, 3rd and 4th speed stages, or by conducting the line pressure delivered at the port 224 of the 1-2 shift valve 210 in the 2nd, 3rd and 4th speed stages through the ports 232 and 234 provided in the 2-3 shift valve 240 so as to communicate with one another only in the 1st and 2nd speed stages, and to supply such a line pressure to the hydraulic pressure chamber 38a of the first clutch 38. In all of these embodiments the passage system for obtaining the line pressure to be delivered only in the 2nd speed stage is opened to drain in a speed stage other than the 2nd speed stage in which the first clutch is engaged, such as the 1st speed stage or the 3rd speed stage, and therefore, the one way valve 237 is required in order to prevent the draining of the first clutch 38 in such speed stages.

Figure 7:
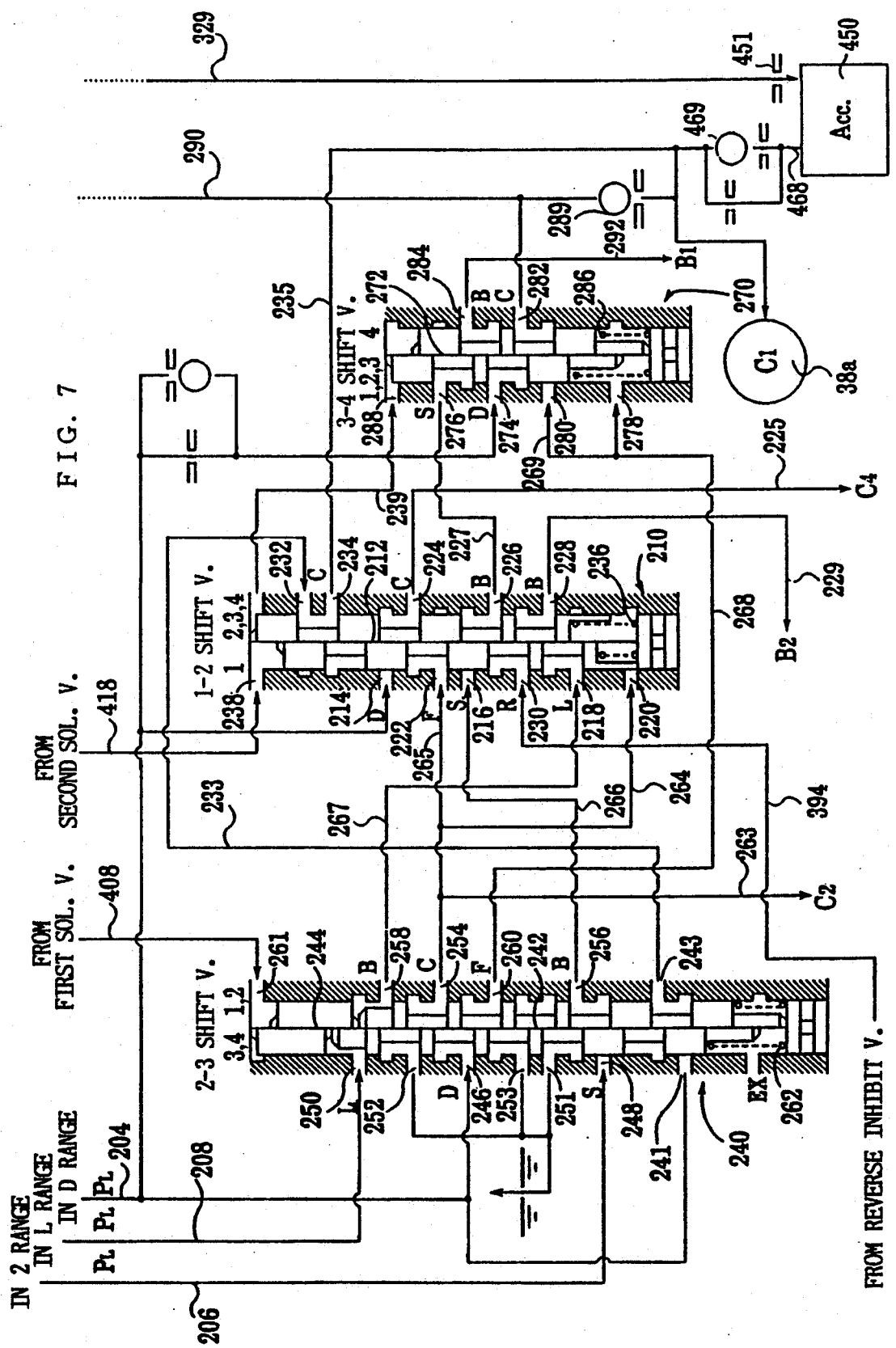
FIG. 7 is a view similar to FIGS. 4-6, showing a fourth embodiment of the present invention.

FIG. 7 is a view similar to FIGS. 4-6, showing a part of the hydraulic control circuit in which a fourth embodiment of the present invention is incorporated. In this fourth embodiment, the 1-2 shift valve 210 has the ports 232 and 234 adapted to be communicated with one another when the spool 212 is in its upper shift position and to be isolated from one another when the spool 212 is in its lower shift position in the same manner as in the first and second embodiments shown in FIGS. 4 and 5, while the 2-3 shift valve 240 has the same construction as that of the 2-3 shift valve 240 in the third embodiment shown in FIG. 6 so as to have such ports 242 and 243 for discriminating the 1st and 2nd speed stages from the 3rd and 4th speed stages. Although this embodiment is disadvantageous in that the total length of the spool valves is longer as compared with the first through third embodiments, it is advantageous in that no one way valve such as 237 is required.

In this fourth embodiment, the port 241 provided in the 2-3 shift valve 240 is supplied with the line pressure in the D range, said pressure being transmitted through the port 243 and the passage 233 to the port 232 of the 1-2 shift valve 210 when the spool 242 is shifted to the lower shift position to set up the 1st or the 2nd speed stage. By this arrangement, the port 232 is supplied with the line pressure in the 1st or the 2nd speed stage as in the first and second embodiments, and the line pressure thus supplied to the port 232 is modified by the 1-2 shift valve 210 to be the line pressure to be delivered at the port 234 only in the 2nd speed stage, said pressure being supplied through the passage 235 to the hydraulic pressure chamber 38a of the first clutch 38. In this embodiment, however, when the spool 242 of the 203 shift valve 240 is shifted to its upper shift position as shown in the left half portion thereof in the figure in the 3rd speed stage, the port 241 is closed by a land portion of the spool 242, and therefore, the passage 233 is not opened to drain in the 3rd speed stage. Therefore, no such one way valve as 237 provided in the passage 233 of the embodiments shown in FIGS. 4-6 is required.

Although the present invention has been described with respect to some particular embodiments thereof, it will be clear to those skilled in the art that the present invention is not limited to such embodiments and various modifications are possible with respect to such embodiments within the spirit of the present invention.

We claim:

1. A hydraulic pressure control device of an automatic transmission for a vehicle, said transmission having a speed stage change-over gear mechanism, and a plurality of hydraulically operated friction engaging means to change over a route of transmittance of torque in said speed stage change-over gear mechanism among various options so as selectively to set up each one of a plurality of speed stages, comprising a plurality of change-over valves to change over supply and exhaust of hydraulic pressure to and from said plurality of friction engaging means according to selection among said speed stages to be set up so as to set a certain one of said plurality of speed stages, wherein a certain one of said friction engaging means is connected with a certain one port of a certain one of said plurality of change-over valves so as to be supplied with or exhausted of hydraulic pressure through said certain one port according to selection among said speed stages to be set up, and means for supplying said certain one friction engaging means with hydraulic pressure through a passage means not passing through said certain one port when said certain one of said plurality of speed stages is set up.

2. A hydraulic pressure control device according to claim 1, wherein said passage means not passing through said certain one port includes a series connection of a first passage means conductive of a line pressure in said one speed stage and another certain first speed stage and a second passage means conductive of the line pressure in said one speed stage and another certain second speed stage excluding said certain first speed stage.

3. A hydraulic control device according to claim 2, wherein said one speed stage is a 2nd speed stage, said certain first speed stage is a 1st speed stage, and said certain second speed stage is a 3rd or a 4th speed stage.

4. A hydraulic control device according to claim 3, wherein said first passage means is provided by a 2-3 shift valve adapted to be shifted between two alternative shifting states according to whether said 1st or said 2nd speed stage is set up or said 3rd or said 4th speed stage is set up.

5. A hydraulic control device according to claim 3, wherein said first passage means is provided by a passage means the conductivity of the line pressure of which is controlled by a solenoid valve adapted to be shifted between two alternative shifting states according to whether said 1st or said 2nd speed stage is set up or said 3rd or said 4th speed stage is set up.

6. A hydraulic control device according to claim 4, wherein said second passage means is provided by a 1-2 shift valve adapted to be shifted between two alternative shifting states according to whether said 1st speed stage is set up or said 2nd, said 3rd or said 4th speed stage is set up.

7. A hydraulic control device according to claim 5, wherein said second passage means is provided by a 1-2 shift valve adapted to be shifted between two alternative shifting states according to whether said 1st speed stage is set up or said 2nd, said 3rd or said 4th speed stage is set up.

8. A hydraulic control device according to claim 4, wherein said 2-3 shift valve has a port which delivers the line pressure in said 1st and said 2nd speed stage and is closed in said 3rd and said 4th speed stage.

9. A hydraulic control device according to claim 2, wherein said one speed stage is a 2nd speed stage, said certain first speed stage is a 3rd or a 4th speed stage, and said certain second speed stage is a 1st speed stage.

10. A hydraulic control device according to claim 9, wherein said first passage means is provided by a series connection of a passage means the conductivity of the line pressure of which is controlled by a solenoid valve adapted to be shifted between two alternative shifting states according to whether said 1st or said 4th speed stage is set up or said 2nd or said 3rd speed stage is set up and a 1-2 shift valve adapted to be shifted between two alternative shifting states according to whether said 1st speed stage is set up or said 2nd, said 3rd or said 4th speed stage is set up.

11. A hydraulic control device according to claim 10, wherein said second passage means is provided by a 2-3 shift valve adapted to be shifted between two alternative shifting states according to whether said 1st or said 2nd speed stage is set up or said 3rd or said 4th speed stage is set up.

* * * * *